US012111027B2

(12) United States Patent
Heller et al.

(10) Patent No.: US 12,111,027 B2
(45) Date of Patent: Oct. 8, 2024

(54) FLAME LAMP DEVICE HAVING TRANSPARENT PANELS FORMING ELONGATED GAPS

(71) Applicant: PLM Global Logistics, LLC, Eau Claire, WI (US)

(72) Inventors: Richard Heller, Minneapolis, MN (US); Dean Hansen, Eau Claire, WI (US)

(73) Assignee: PLM Global Logistics, LLC, Eau Claire, WI (US)

( * ) Notice: Subject to any disclaimer, the term of this patent is extended or adjusted under 35 U.S.C. 154(b) by 0 days.

(21) Appl. No.: 18/180,386

(22) Filed: Mar. 8, 2023

(65) Prior Publication Data

US 2024/0302012 A1 Sep. 12, 2024

(51) Int. Cl.

*F21S 13/10* (2006.01)
*F21V 21/08* (2006.01)
*F21V 37/00* (2006.01)

(52) U.S. Cl.

CPC .......... *F21S 13/10* (2013.01); *F21V 21/0824* (2013.01); *F21V 37/0008* (2013.01)

(58) Field of Classification Search

CPC .................................. F21L 17/00; F21S 13/10
See application file for complete search history.

(56) References Cited

U.S. PATENT DOCUMENTS 7,097,448 B2 8/2006 Chesney
2009/0016048 A1 1/2009 McBrien et al.
2019/0257517 A1* 8/2019 Andersen ................ F23D 14/38

OTHER PUBLICATIONS

Halofire, Compare Tiki Torch Models . . . , screenshot of webpage captured Mar. 8, 2023, 12 pages, https://www.halofiretorch.com/pages/side-by-side-comparison-chart-tiki-torch-and-table-torch, United States.

* cited by examiner

*Primary Examiner* — Robert J May
(74) *Attorney, Agent, or Firm* — Anthony J. Bourget

(57) ABSTRACT

Devices, systems, and methods of allowing external air to access a chamber of a flame lamp device, including positioning upstanding transparent panels in slots of a top member of a base, the transparent panels in part forming a chamber, the base having at least one side vent, the panels positioned to form elongated gaps between adjacent transparent panels, orienting the panels in the slots in a spaced relationship with the base which allows external air to enter the at least one vent into the base and upward through at least one opening in the top member and into the chamber to fuel a flame.

21 Claims, 7 Drawing Sheets

FLAME LAMP DEVICE HAVING TRANSPARENT PANELS FORMING ELONGATED GAPS

BACKGROUND OF THE INVENTION

Lamps, lanterns, torch lamps or flame lamp devices are used to provide outdoor lighting, warmth and decoration. Sometimes flame lamps are positioned as a torch on an upstanding post, or multiple torch devices may be oriented to outline a perimeter of a patio, camp site, camp fire or other outdoor area. Some flame lamps may also be positioned on a table or other surface for light, heat and enjoyment. Some examples of gas supplied torch lamps or similar devices for which patents have been sought or granted include US Patent Application No. 2009/0016048 to McBrien et al., and U.S. Pat. No. 7,097,448, to Chesney. While such devices or systems may have benefits, there is room for improvement.

SUMMARY OF THE INVENTION

Applicants recognize past flame devices may be lacking in supplying sufficient airflow to a flame lamp device or torch to keep the flame burning as desired. Heretofore unappreciated was allowing multiple sources of external airflow, from multiple dimensions, into a chamber area where a flame is to burn. The present invention in one aspect pertains to a flame lamp device configured to allow external airflow to a chamber defined in part by a plurality of transparent panels upstanding from a base of the lamp device. The panels define elongated gaps between edges of adjacent panels which allow external air to flow into the chamber. In addition to the elongated gaps being a source of airflow, applicants present configurations for further external air sources. The base includes a top member having at least one air opening for air to also flow upward into the chamber. In one aspect the base includes a bottom member having at least one bottom air opening which allows external air to flow through the bottom opening, through the top opening and into the chamber to also fuel the flame in the chamber. In one aspect the base includes at least one side vent which allows external air to also flow through the side vent into the base, through the top opening and into the chamber to fuel the flame.

In a further aspect the invention includes a flame lamp device having a base having a top portion and a plurality of side vents, at least three transparent panels projecting upward from the base, the panels oriented such that adjacent panels define elongated gaps between edges of the adjacent panels, the transparent panels at least in part defining a chamber, the top portion of the base having an opening configured to allow a flame to project into the chamber where the side vents and the elongated gaps allow air to flow into the chamber to feed the flame. In aspects the invention includes a base which receives four or more transparent panels forming the chamber.

In a further aspect the invention includes a flame lamp device having a base having a top member and a bottom member, at least one air vent oriented between the top member and the bottom member, the top member having a plurality of top member air openings, a top member flame opening configured to allow a flame to project upward from the base, and a plurality of slots configured to receive transparent members, the bottom member having a plurality of bottom member air openings, an oil receptacle configured to receive oil to fuel the flame where the bottom member air openings and the at least one air vent allow air to flow into the base and upward through the top member air openings.

In a further aspect the invention includes a flame lamp device having a base having a top member and a bottom member, a plurality of air vents oriented between the top member and the bottom member, the top member having a plurality of top member air openings and a plurality of slots configured to receive transparent panels, a plurality of transparent panels positioned in the slots, the transparent panels oriented such that adjacent transparent panels define elongated gaps between edges of the adjacent transparent panels, the transparent panels oriented in a spaced relationship with respect to the bottom member.

In further aspects the invention includes methods of allowing external air to access a chamber of a flame lamp device, including positioning upstanding transparent panels in slots at a top member of a base, the transparent panels in part forming a chamber, the base having at least one side vent, the panels positioned to form elongated gaps between adjacent transparent panels, orienting the panels in the slots in a spaced relationship with the base to allow external air to enter the at least one vent into the base and upward through the top member and into the chamber.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
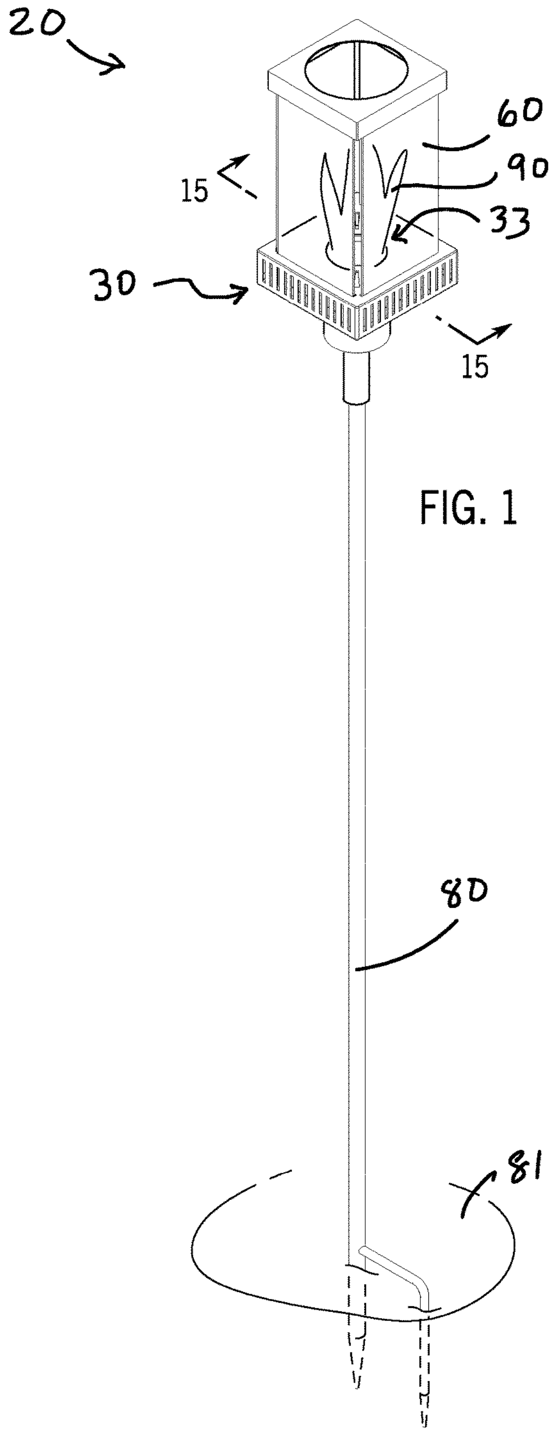
FIG. 1 is a perspective view of a device in accordance with aspects of the invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-15, aspects of the devices, systems and methods of the invention are shown. Device 20 is a flame lamp device which displays a flame 90 visible through transparent panels 60 such as glass, plastic or other transparent material. Device 20 is configured such that flame 90 may swirl within a chamber 66 defined at least in part by the transparent panels 60. As described in greater detail herein, air flows into the chamber 66 through elongated gaps 64 between respective adjacent transparent panels 60 which panels 60 project upward from a base 30. Air may also flow into the chamber 66 through air openings 36 in the base via side vents 44 of the base 30 and/or via air openings 39 in a bottom member 38 of the base 30. In one aspect device 20 is used in conjunction with a stake 80 for insertion of the device 20 into the ground 81. In other aspects device 21 is a tabletop variety for use on a tabletop or similar surface.

Figure 2:
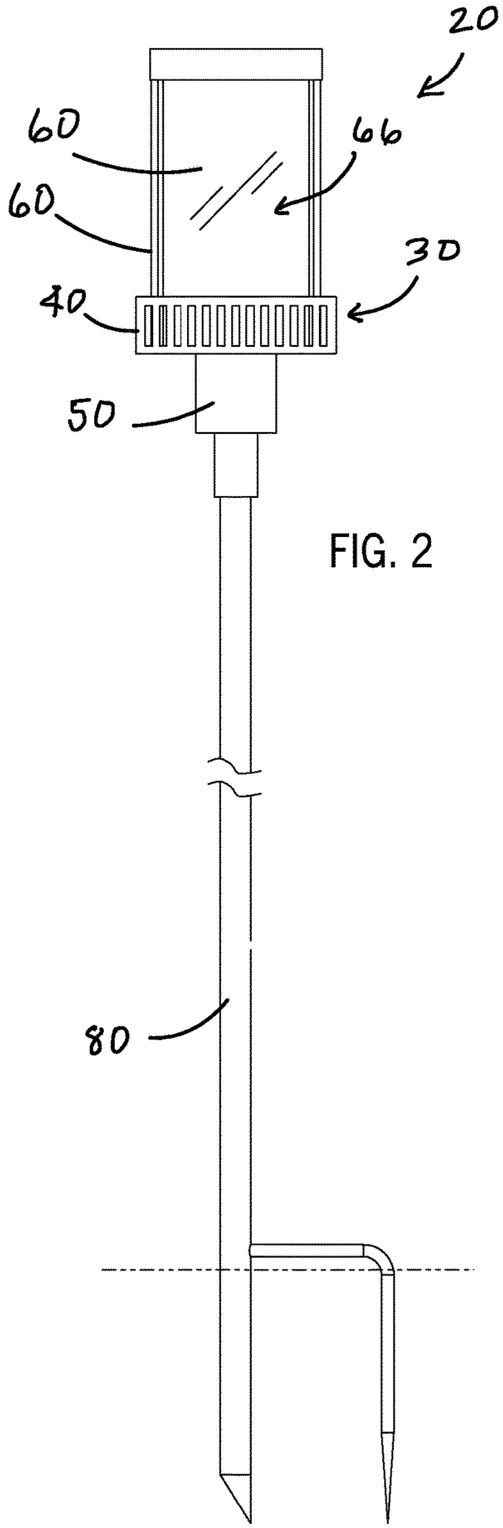
FIG. 2 is a front view of the device of FIG. 1.

FIG. 1 and FIG. 2 show device 20 in conjunction with a removable stake 80 and inserted into the ground 81 in a representative manner. Stake 80 is detachable and may come in multiple segments for easy storage and shipping. Stake 80 may be of a screw-in or twist and adjust variety. Stake 80 connects to base 30 of device 20, and in one instance may connect to a stem 50 associated with base 30. In aspects the stem 50 is part of base 30 and in other aspects stem 50 connects to base 30 directly. Device 20 may be retrofitted by connecting a stake 80 to the base 30 or stem 50 as desired.

Figure 3:
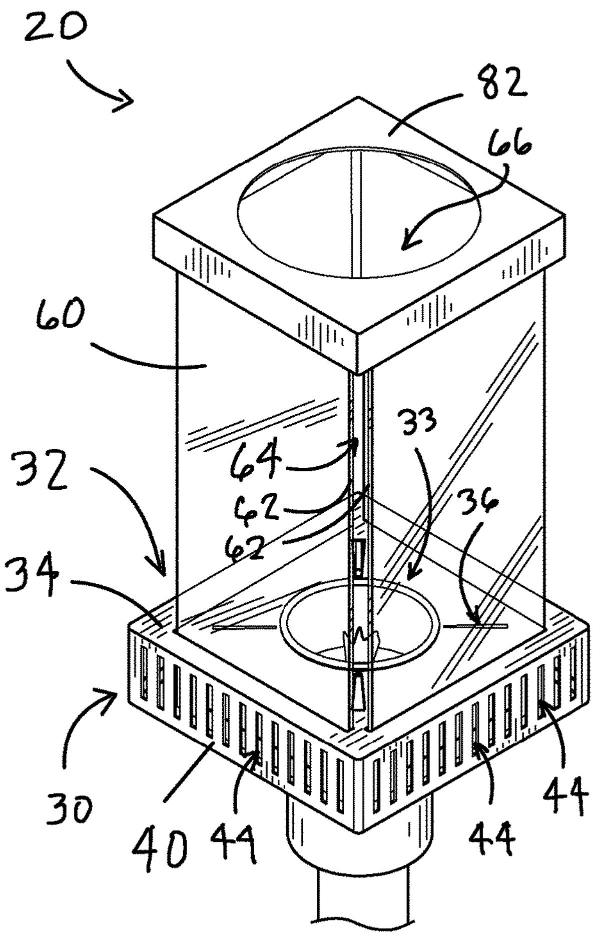
FIG. 3 is a partial top perspective view of the device of FIG. 1.
Figure 4:
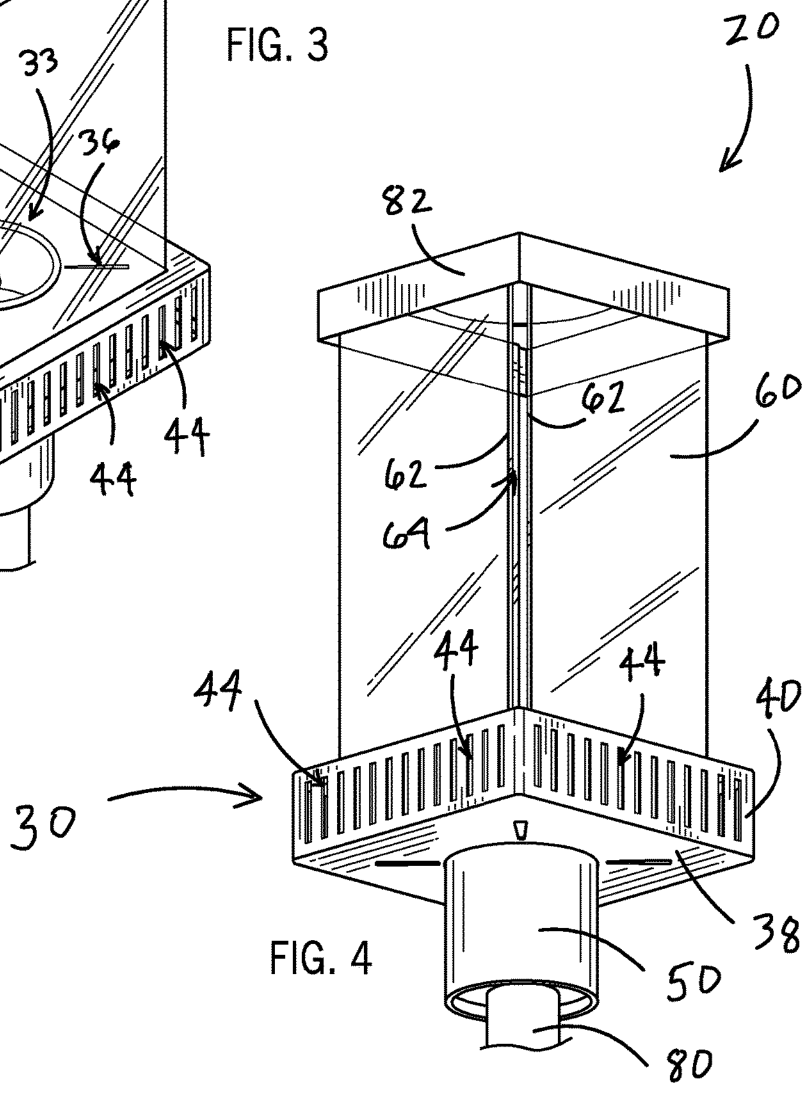
FIG. 4 is a partial bottom perspective view of the device of FIG. 1.

FIG. 3 and FIG. 4 show close-up perspective views of device 20 having a base 30 having a top portion 32 and a plurality of side vents 44. Top portion 32 includes a top portion opening 33 which allows a flame, such as flame 90, to project into the chamber 66. In one aspect the top portion 32 includes a top member 34. The panels 60 include edges 62. The panels 60 project upward from base 30 and are oriented such that adjacent panels 60 define elongate gaps 64 between respective edges 62 of adjacent panels 60. The elongated gaps 64 allow external air to flow into the chamber 66 to feed the flame 90. The side vents 44 also allow external air to flow into the chamber to feed the flame 90. In one aspect top member 34 includes top member openings, or air openings 36 which allow air to pass from the side vents 44 into the chamber 66. External air passes through side vents 44, into base 30, and upward via top member air openings 36. In aspects, device 20, 21 includes a bottom member 38 where bottom member 38 includes bottom member air openings 39. External air passes through bottom air openings 38 into base 30 and upward through air openings 36 into the chamber 66 to fuel the flame 90. Applicants have found that having multiple paths for feeding external air to the chamber 66 provides a desired flame structure or flame display and sufficient external air to allow flame 90 to continue to burn. External air enters the sides of the chamber via the longitudinal gaps and also enters at a bottom area of the chamber to provide the desired flame attributes.

Figure 5:
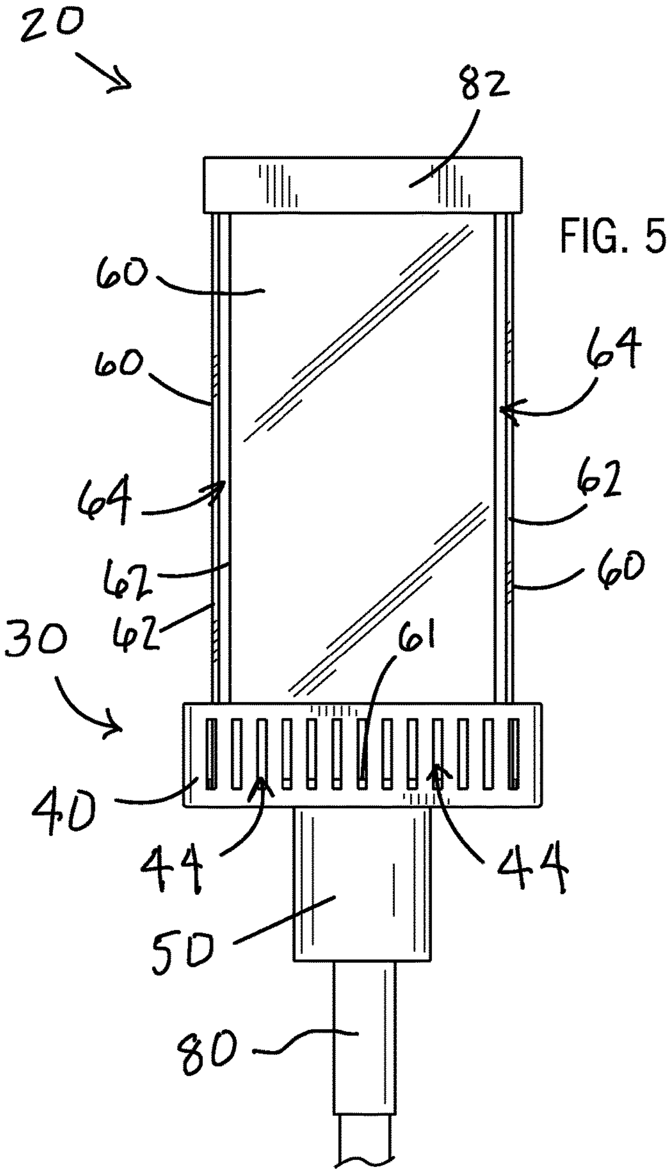
FIG. 5 is a partial front view of the device of FIG. 1.

FIG. 5 is a closeup view of device 20 and shows the panels 60 positioned within base 30. In one aspect, panel 60 includes a panel bottom edge 61. As shown in FIG. 5, panel bottom edge 61 is positioned in a spaced relationship with respect to a bottom of the base 30. Particularly, panel bottom edge 61 is in a spaced relationship with respect to bottom member 38. This spaced relationship allows external air flowing in from the side vents 44 to also flow further into the base 30 and upward to the chamber 66. A lid 82 is provided at an upper arca of device 20. Lid 82 secures the upper portions of panels 60 in a stable arrangement so the panels remain upright and avoid tilt or skewing. Lid 82 includes a lid opening 84 to allow flame and gases and heat to escape upward from chamber 66 and device 20.

Figure 6:
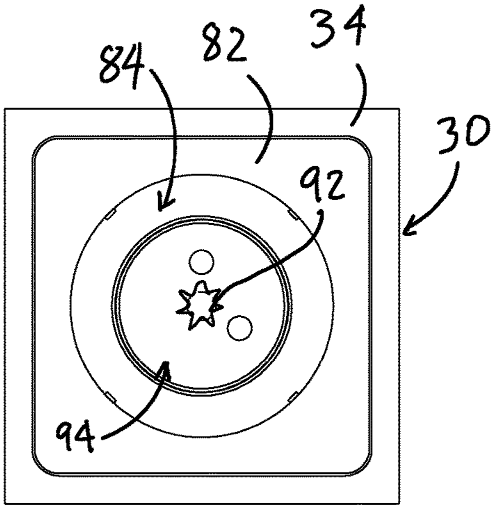
FIG. 6 is a top view of the device of FIG. 1.

FIG. 6 is a top view of device 20, 21 showing wick 92 visible through lid opening 84 of lid 82. In one aspect a wick cup 94 is utilized to hold the wick 92 and to also capture extra oils and debris. In reference to FIG. 9, wick cup 94 includes a wick opening 95 to accommodate receipt of the wick 92 and allows the wick 92 to pass through the wick cup 94 and into an oil receptacle 55. Wick cup 94 also includes at least one port 96 to allow extra oil to pass through wick cup 94 and into oil receptacle. Port 96 allows gravity removal of excess oil to minimize or prevent oil buildup and inadvertent ignition of the oil (or inadvertent ignition of other dangerous fuel materials which might be present in wick cup 94). In one aspect wick cup 94 includes multiple ports 96. In one aspect wick cup 94 includes a rim or cup lip 98. Cup lip 98 allows for wick cup 94 to insert into a top member opening where the cup lip 98 allows the wick cup 94 to hang downward into base 30.

Figure 7:
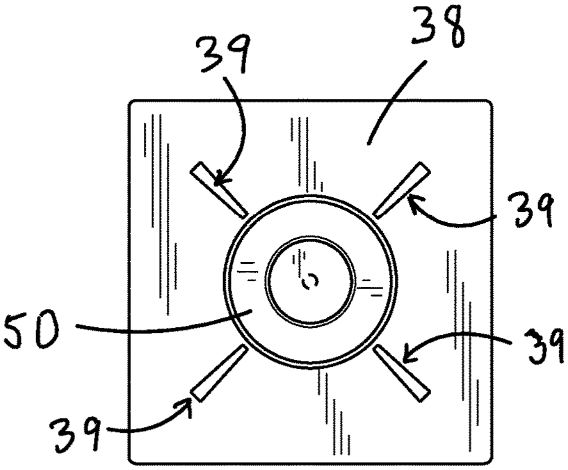
FIG. 7 is a bottom view of the device of FIG. 1 with aspects removed for clarity.

FIG. 7 shows a bottom view of device 20. Base 30 includes a bottom member 38. In aspects, bottom member 38 includes bottom member air openings 39. While FIG. 7 depicts use of four openings 39, additional openings and opening configurations may be used. Openings 39 are optional in some instances, such as with a tabletop variety with device 21. In some aspects device 21 may also include feet or spacers to allow bottom 38 to be oriented slightly upward from a tabletop to allow a gap for additional external air to enter chamber 66 via bottom 38.

Figure 8:
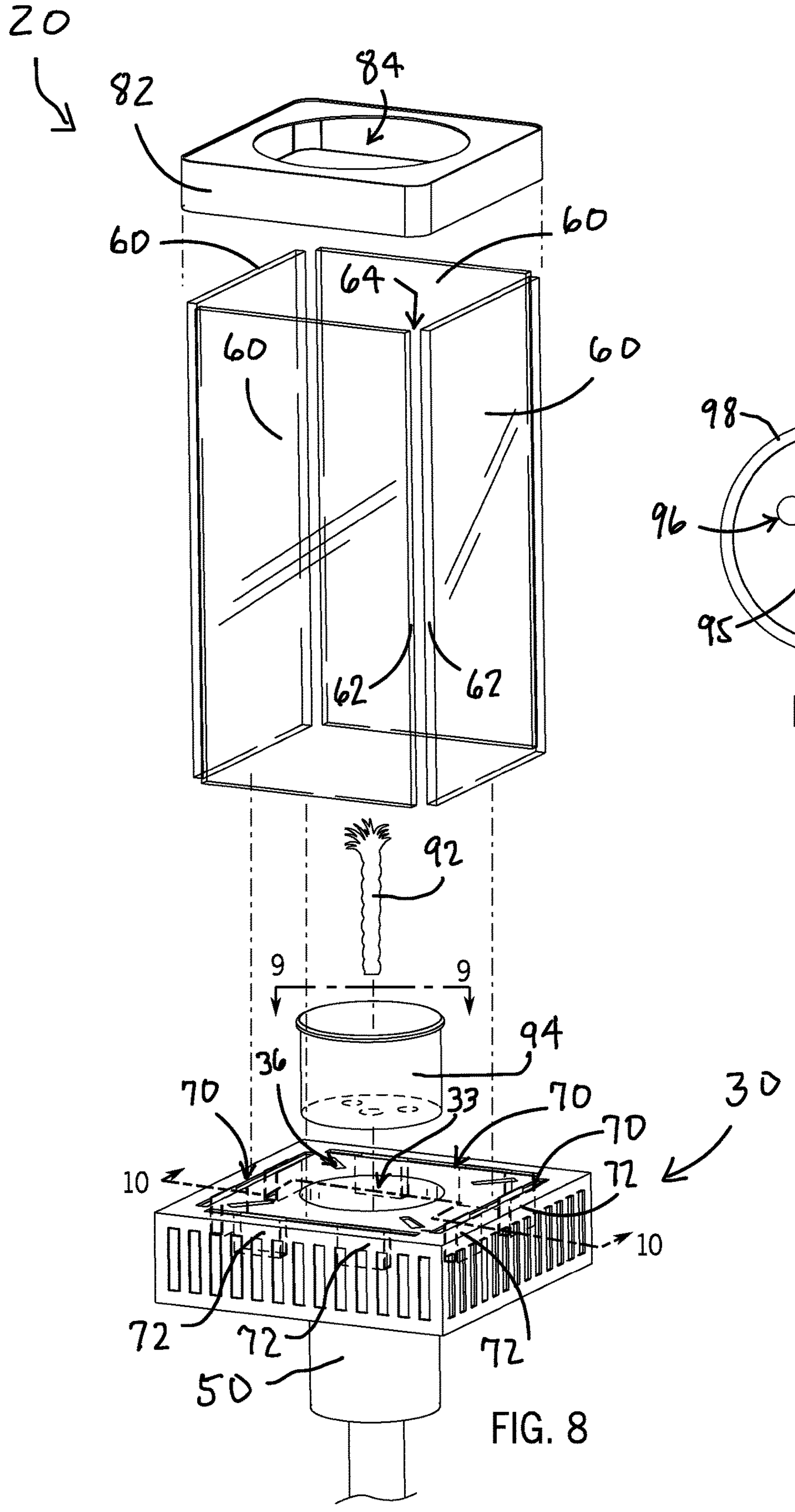
FIG. 8 is an exploded view of the device of FIG. 1.
Figure 9:
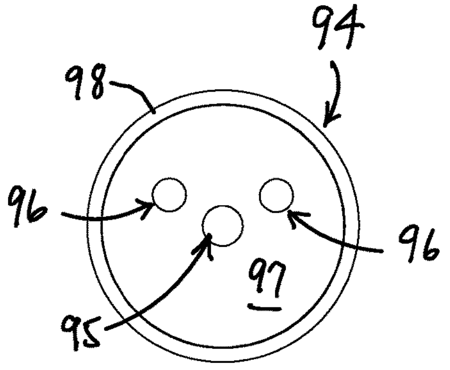
FIG. 9 is a is a top view of a component for use with the device viewed along line 9-9 of FIG. 8.

FIG. 8 is an exploded perspective view of a device 20 in accordance with one aspect of the invention. Base 30 includes slots 70 which are configured to receive panels 60. Slots 70 are configured such that when panels 60 insert into slots 70, the panels 60 form the elongated gaps 64. In one aspect, the base 30 of device 20 includes four slots 70 and receives four panels 60. In other aspects, base 30 may include three slots 70 to receive three panels 60 for a triangular arrangement. In other aspects, base 30 may include five or more slots to receive five or more panels 60 for alternative arrangements. In one aspect, slots 70 have rectangular openings to receive a rectangular end of a panel 60. In alternative aspects, curved slots and curved transparent panels may also be used, while still maintaining elongated gaps 64. Base 30 shown in FIG. 8 is rectangular. In other aspects, base 30 may be cylindrical with rounded sides having side vents 44 therein. Base 30 may be of other (non-rectangular) shape, provided base 30 includes vents to allow external air to pass into the base 30, beneath panels 60, and upward into a chamber 66.

In one aspect FIG. 8 shows base 30 having a top portion opening 33 leading to a cavity in which wick cup 94 is positioned. Top portion opening 33 also leads to a fuel receptacle, such as an oil receptacle 55. The oil receptacle 55 defines an oil reservoir 56 for storage of lamp oil, for instance. In one aspect oil receptacle 55 is positioned below base 30. In other aspects it may be appreciated that oil receptacle 55 may be positioned within base 30. In one aspect, with respect to FIG. 12, oil receptacle is positioned within base 30. In one aspect oil receptacle 55 is positioned within stem 50. In further reference to FIG. 8, wick cup 94 inserts into base 30 and panels 60 insert into slots 70 of base 30.

Figures 10, 11:
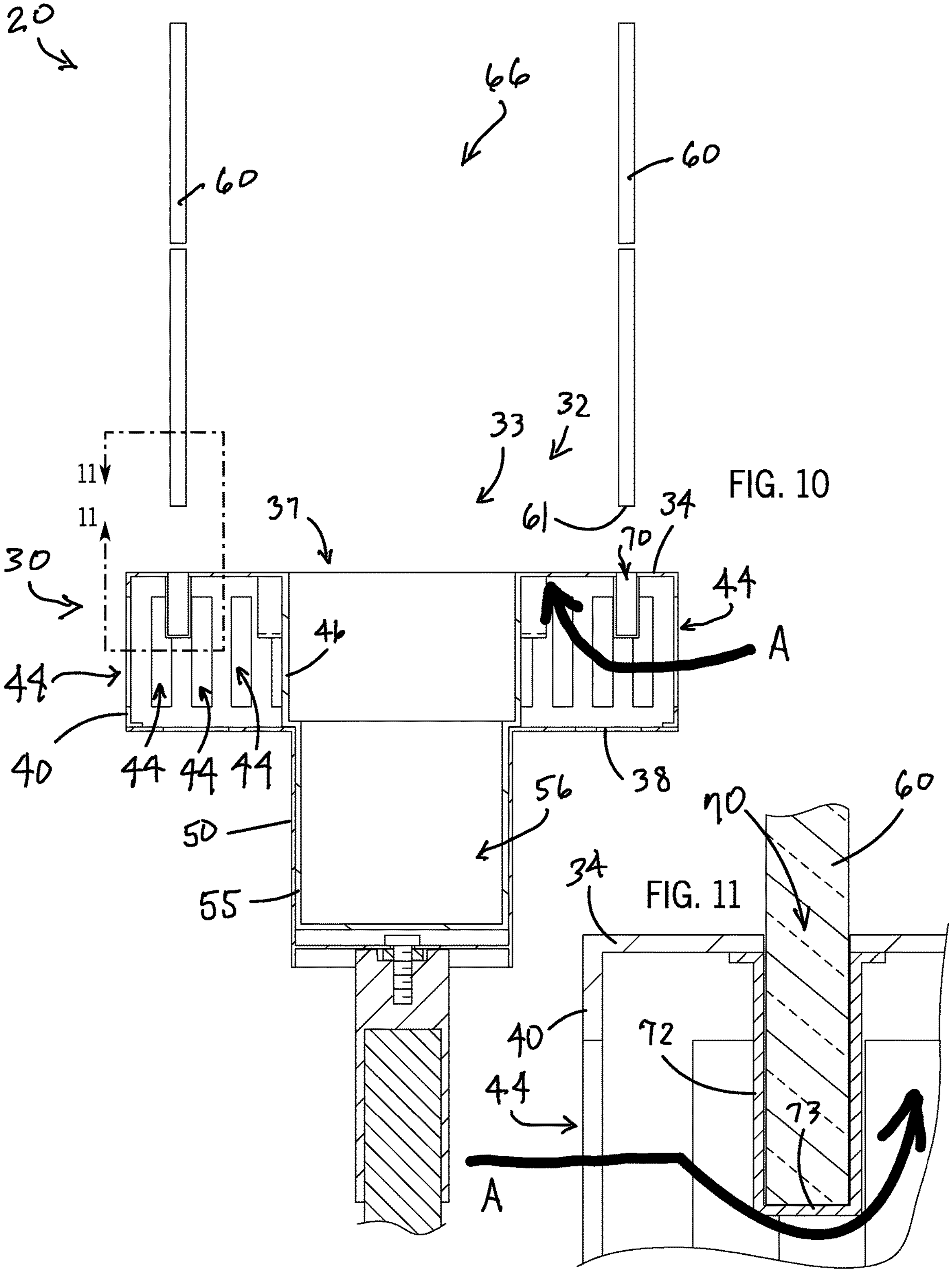
FIG. 10 is a section view of the device taken along line 10-10 of FIG. 8.
FIG. 11 is a partial section view of the device taken along line 11-11 of FIG. 10.

FIG. 10 is a section view of device 20 and shows multiple vents 44 at base 30. Vents 44 allow external air to enter the base 30. In one aspect, vents 44 are positioned about a perimeter of base 30. In one aspect, vents 44 are defined by a side member 40. In one aspect side member 40 comprises four segments which form about a perimeter of the base in a rectangular orientation. In one aspect the perimeter is a square perimeter as represented in examples of the drawings. More or fewer vents 44 may be utilized as desired. FIG. 10 also depicts an air flow represented by Arrow A, showing air flowing into a vent 44 of side member 40. The air flows beneath a panel bottom edge 61 of a panel inserted into the base 30. Particularly, and also with reference to FIG. 11, panel 60 inserts into slot 70 and is held into position in one aspect by a cradle 72. Cradle 72 comprises bottom and side walls, where a bottom wall 73 receives panel bottom edge 61 to retain panel 60 in a suspended orientation. More particularly, cradle 72 prevents panel 60 from sliding further into base 30, and allows panel 60 to be oriented in a spaced relationship with respect to a bottom of the base 30, such a bottom member 38. This spaced relationship allows for air to travel into base 30 from bents 44, below panel 60, and upward toward chamber 66 (see, for instance, air flow arrow A in FIG. 10 and FIG. 11). The flowing air enters the chamber via openings 36. In further reference to FIG. 8, base 30 includes a plurality of cradles 72. In one aspect, two cradles 72 are provided for each side of the base 30. Additional or fewer cradles 72 may be utilized. In one aspect cradle 72 is configured with tapering side walls to accommodate a friction fit with a lower portion of a panel 60 so better secure the panel in an upright and stable orientation. In one aspect, cradle 72 is positioned such that bottom wall 73 is positioned with at least a quarter inch of clearance from bottom of base 30. In aspects, at least an inch or more of clearance from a bottom of base 30 is provided.

In alternatives to use of a cradle 72, a porous block may be positioned upon or adjacent bottom member 38 so that bottom edge 61 of a panel 60 rests upon the block which nonetheless allows air to flow through the block and under the panel 60. A single block or multiple blocks may be utilized within base 30 to accommodate the air flow in this manner.

FIG. 10 shows bottom member 38 as integral with stem 50, i.e., made from the same layer of material. It may be appreciated, however, that bottom member 38 is a singular piece connected to stem 50. In one aspect stem 50 may be secured to bottom member 38 by welding or other connection or abutting means. In one aspect with respect to FIG. 10, oil receptacle 55 is a singular piece spanning upward to a top member 34. It may be appreciated, however, that oil receptacle 55 is a singular piece within stem 55, where an annular wall 46 may extend upward within base 30 to receive wick cup 94. Annular wall in one instance is separate from oil receptacle 55, yet align together when assembled. In FIG. 10, annular wall has an inner diameter greater than an inner diameter of oil receptacle 55. In one aspect annular wall and receptacle 55 have the same inner diameter. Having a same diameter presents a smooth transition from annular wall 46 into receptacle 55. Wick cup 94 inserts into annular wall 46, which allows the wick 92 to extend downward into receptacle 55. In other aspects, top portion 32 may include a top portion opening 33 that is positioned above a top member 34, such as where a wick cup 94 may be positioned in a more upward location as compared to what is shown in the drawings, or in a case where the flame is formed at a more upward location compared to what is shown. In alternatives, a gas-fed flame may be produced at the top portion opening 33, so that a wick cup 94 is not present. In alternatives, a different fuel source may be used. In one aspect a gas line is oriented so that an exit port of the gas line is situated in or near the annular wall 46 or otherwise within flame opening 37, and in some cases above opening 37 to allow for a supply of gas to fuel a flame 90. A spark generator or ignition system (or port hole for insertion of a match or flame) may be included within or near base 30 to accommodate lighting of a gas flame.

Figure 12:
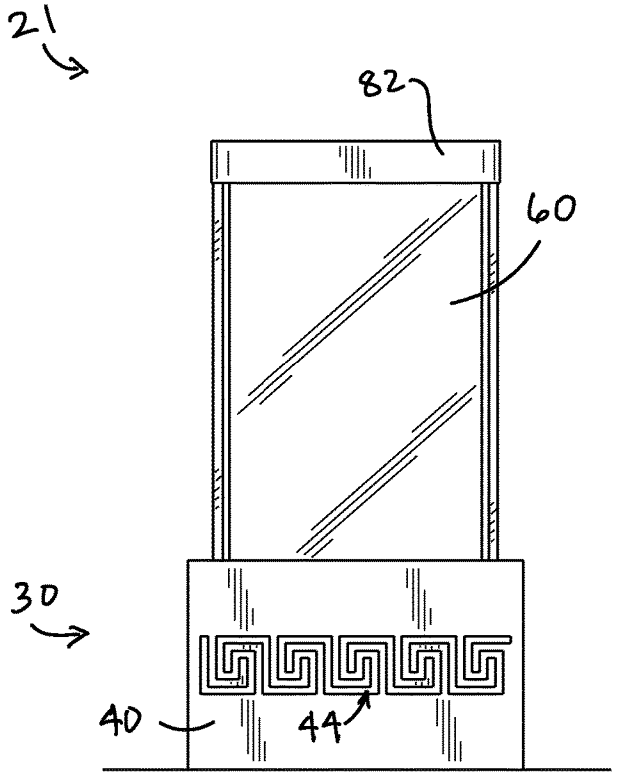
FIG. 12 is a front view of a device in accordance with a further aspect of the invention.
Figure 13:
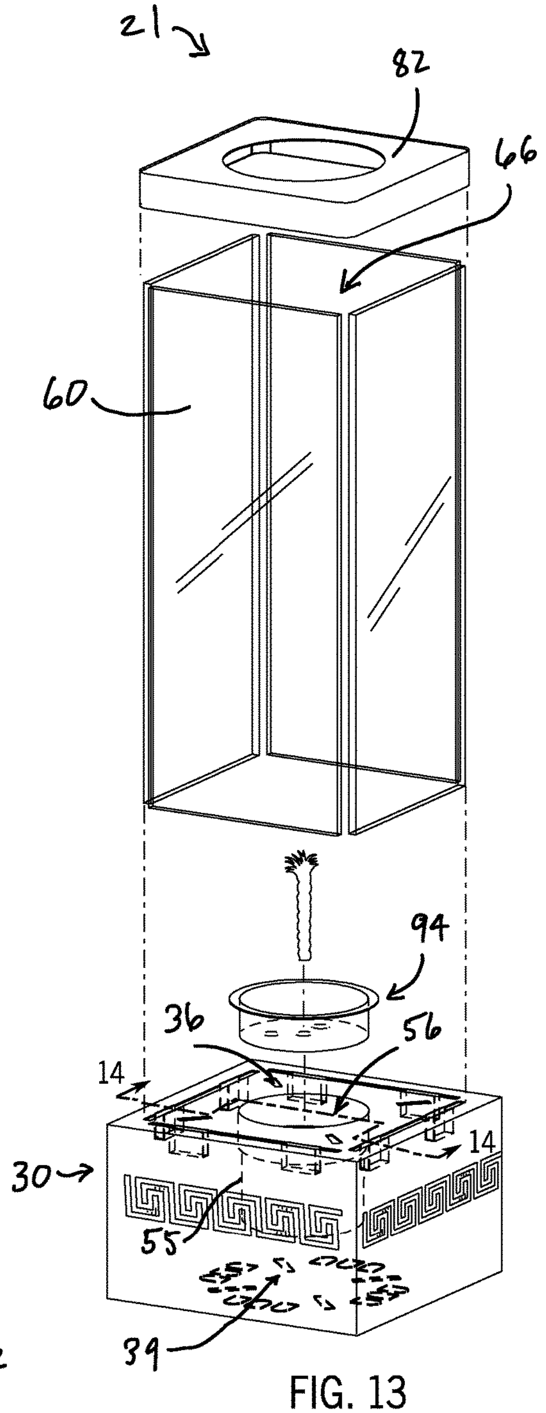
FIG. 13 is an exploded perspective view of the device of FIG. 12.
Figure 14:
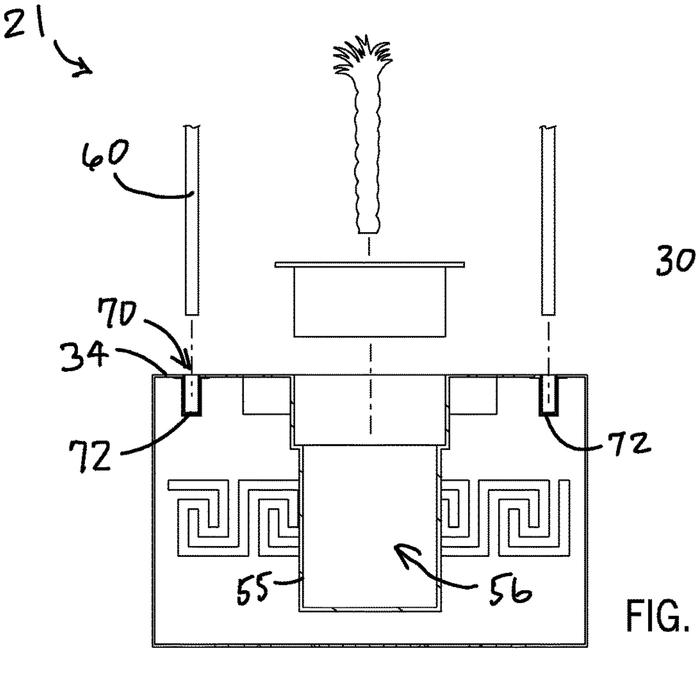
FIG. 14 is a section view of the device taken along line 14-14 of FIG. 13.

FIG. 12, FIG. 13 and FIG. 14 show flame lamp device 21 in an alternative aspect. Base 30 is configured to rest upon a table or other surface. In aspects, vent 44 may be a single vent or comprise a plurality of vents 44, or may comprise a design of a single vent 44 at a side of base 30. Vent 44 may also present an artistic design or other pattern. While a side member 40 is used as part of base 30, it may be appreciated that a side member in not necessarily required, provided a plurality of side vents 44 are present. For instance, side vents 44 may comprise large open areas posts which support top member 34 in a spaced relationship from bottom member 38. The side vents 44 of device 20, 21 may be large gaps or holes between other structures, and not simply slits or slots or holes presented in a panel.

Multiple transparent panels 60 insert into slots 70 of base 30 and form elongated gaps 64 as with the device 20. Additional features of device 20 may also be incorporated into the device 21. As shown in FIG. 14, cradles 72 are used in one aspect to retain panels in a spaced relationship with a bottom of base 30 to accommodate the air flow as shown in FIG. 10 and FIG. 11. A wick cup 94 may insert into base 30 and a wick 92 may draw lamp oil from oil reservoir 56. A gas fed system as referenced above with device 20 may also be utilized. A block system may also be utilized as reference with device 20 to provide the air spaces below panels 60 to assist with providing external air to chamber 66. FIG. 13 shows optional openings 39 in a bottom of base 30. In further aspects, feet or spacers may be provided at a bottom of base 30 to provide a space for external air to enter the bottom of base 30 and travel upward through air openings 36 into chamber 66 to fuel the flame 90.

Figure 15:
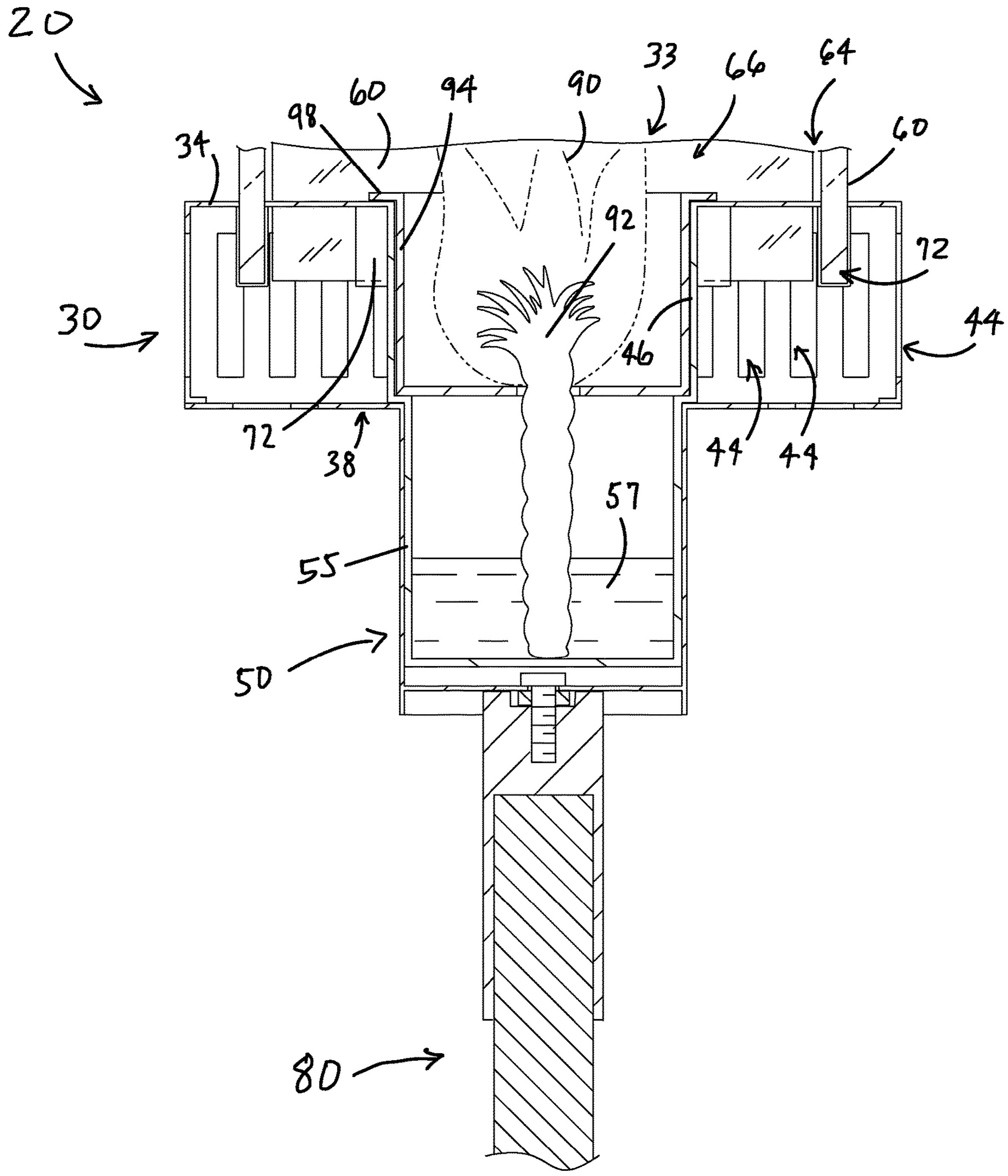
FIG. 15 is a section view of the device taken along line 15-15 of FIG. 1.

FIG. 15 is a section view of device 20 and shows a flame 90 on wick 92 within chamber 66. In operation, lamp oil 57 may be positioned in oil receptacle 55. A wick 92 is inserted into and through wick opening 95 within wick cup 94. Wick cup 94 is inserted into the base such that the wick 92 dips into the lamp oil within the receptacle 55 (to draw the oil upward for fueling the flame 90). The panels 60 are inserted into slots 70 and lid 82 positioned at the top of panels 60 to hold the panels in place. A match or lighter is used to light a flame to wick 90, and the flame raises into chamber 66 which is fueled by external air entering via elongated gaps 64 and/or via air openings 36. External air may also enter chamber 66 via side vents 44 where the external air passes into the base 30 and upward through openings 36 within the chamber area. External air may also enter chamber 66 via bottom air openings 39 where the external air passes into the base 30 and upward through openings 36 within the chamber area. As flow of external air varies, the motion of the flame 90 within the chamber will vary. In alternatives, the fuel receptacle 55 has an inner diameter which matches or nearly matches an inner diameter of annular wall 46 of wick cup 94. In aspects, stem 50, which contains receptacle 55, is connected to bottom member 38. In other aspects stem 50 and bottom member 38 are integrally connected. In further aspects, fuel receptacle is position within base 30 and wick cup 94 positioned at least partly within base 30 and partly extending above base 30. The device 20 may be presented on a stake 80 inserted into the ground 81 as would a typical torch lamp. Multiple devices 20 may be utilized to light and decorate a desired area. The device 21 may also be presented on a table flat surface for desired display.

In a further aspect as may be appreciated throughout the drawings and the above disclosure the invention comprises a base 30 configured to receive a plurality of transparent panels 60 which project upward from the base 30, the panels 60 oriented such that adjacent panels 60 define elongated gaps 64 between edges 62 of adjacent panels 60, the panels 60 at least in part defining a chamber 66, and a lid 82 positioned atop the panels 60, the lid 82 having an opening 84. In one aspect opening 84 is a central opening at an uppermost portion of the lid 82. The lid 82 allows for the panels to align securely in an upright position without undue movement. As may be appreciated, allow may flow through elongated gaps 64 into the chamber 66 to fuel a flam 90 which projects upward from atop portion 32 of base 30. In alternatives or as optional features to use of lid 82, the base includes side vents 44 and/or top member openings 36 and/or bottom member air openings 39 which allow further input of external air into chamber 66 to fuel the flame 90. In one aspect the panels 60 insert into slots 70 within base 30. Panels 60 may be connected to base 30 in or with other means, including insertion of the panels into friction slots on top of base 30, or by other fastening mechanisms.

In a further aspect the invention comprises a method of allowing external air to access a chamber of a flame lamp device, the method including positioning upstanding transparent panels in slots at a top member of a base, the transparent panels in part forming a chamber, the base having at least one side vent, the panels positioned to form elongated gaps between adjacent transparent panels, orienting the panels in the slots in a spaced relationship with the base, thereby allowing external air to enter the at least one vent into the base and upward through the top member and into the chamber.

It should be understood, of course, that the foregoing relates to exemplary embodiments of the invention and that modifications may be made without departing from the spirit and scope of the invention as set forth in the following claims.

What is claimed is:

1. A flame lamp device, comprising:

a base having a top portion and a plurality of side vents;

at least three transparent panels projecting upward from the base, the panels oriented such that adjacent panels define elongated gaps between edges of the adjacent panels, the transparent panels at least in part defining a chamber, the top portion of the base having an opening configured to allow a flame to project into the chamber, the side vents in communication with the chamber;

whereby the side vents and the elongated gaps allow air to flow into the chamber to feed the flame.

2. A flame lamp device, comprising:

a base having a top portion and a plurality of side vents;

at least three transparent panels projecting upward from the base, the panels oriented such that adjacent panels define elongated gaps between edges of the adjacent panels, the transparent panels at least in part defining a chamber, the top portion of the base having an opening configured to allow a flame to project into the chamber;

the opening is a central opening configured to receive a wick cup, the wick cup having a wick opening to allow a wick to pass therethrough and having at least one port at a bottom of the cup whereby the side vents and the elongated gaps allow air to flow into the chamber to feed the flame.

3. The device of claim 2 where the at least one port is configured to allow fluid to drain from the cup to a fuel receptacle below the base.

4. The device of claim 1 where the top portion comprises a top member having at least three air openings which allow air flowing from the plurality of side vents into the base to flow into the chamber.

5. The device of claim 1 further comprising a lid positioned atop the transparent panels, the lid having a central opening.

6. The device of claim 1 where the top portion comprises a top member defining at least three slots, the at least three transparent panels positioned in the slots.

7. The device of claim 6 where the base further comprises a bottom member oriented opposite the top member and wherein the at least three slots are configured such when at least one of the transparent panels is inserted into one of the at least three slots, the transparent panel member is oriented in a spaced relationship with respect to the bottom member.

8. The device of claim 7 where at least one of the at least three transparent panels is positioned at least 0.25 inches from the bottom member.

9. The device of claim 1 where the top portion includes a top member and where the at least three transparent panels include four transparent panels, each of the panels positioned in a respective slot defined by the top member, the top member further defining a plurality of air openings configured to allow air flowing from the plurality of side vents into the base to flow into the chamber.

10. The device of claim 1 further comprising an oil receptacle positioned below the top portion opening.

11. The device of claim 1 further comprising an oil receptacle positioned below the base, a wick cup positioned within the base and above the oil receptacle, the wick cup having at least one port at a bottom of the wick cup and a wick opening at the bottom of the wick cup.

12. The flame lamp device of claim 1 where the base includes a bottom member, a stake positioned below the bottom member and extending downward.

13. A flame lamp device, comprising:

a base having a top portion and a plurality of side vents;

at least three transparent panels projecting upward from the base, the panels oriented such that adjacent panels define elongated gaps between edges of the adjacent panels, the transparent panels at least in part defining a chamber, the top portion of the base having an opening configured to allow a flame to project into the chamber;

the plurality of side vents are defined by a side member, the side member extending downward from a top member of the top portion to a bottom member of the base, the bottom member including bottom openings in communication with the chamber via a plurality of openings defined by the top member, whereby the side vents and the elongated gaps allow air to flow into the chamber to feed the flame.

14. The device of claim 13 where the side member has a measure of about 50 mm between the top member and the bottom member.

15. The device of claim 13 where an outer perimeter of the top member is rectangular, the side member comprising four segments.

16. The device of claim 13 further comprising a stem extending downward from the bottom member.

17. A flame lamp device, comprising:

a base having a top member and a bottom member, at least one air vent oriented between the top member and the bottom member;

the top member having a plurality of top member air openings, a top member flame opening configured to allow a flame to project upward from the base, and a plurality of slots configured to receive transparent members;

the bottom member having a plurality of bottom member air openings; and an oil receptacle configured to receive oil to fuel the flame;

whereby the bottom member air openings and the at least one air vent allow air to flow into the base and upward through the top member air openings.

18. The flame lamp device of claim 17 further comprising a plurality of transparent panels positioned in the slots, the transparent panels oriented such that adjacent transparent panels define elongated gaps between edges of the adjacent transparent panels, the transparent panels at least in part defining a chamber into which the flame extends, whereby air flowing into the at least one air vent may travel to the chamber.

19. The flame lamp device of claim 17 further comprising at least three transparent panels positioned in the slots, at least one of the transparent panels oriented in a spaced relationship to the bottom member.

20. A flame lamp device, comprising:

a base having a top member and a bottom member, a plurality of air vents oriented between the top member and the bottom member;

the top member having a plurality of top member air openings and a plurality of slots configured to receive transparent panels, the plurality of air vents in communication with the air openings;

a plurality of transparent panels positioned in the slots, the transparent panels oriented such that adjacent transparent panels define elongated gaps between edges of the adjacent transparent panels, the transparent panels oriented in a spaced relationship with respect to the bottom member.

21. A flame lamp device, comprising:

a base having a top member and a bottom member, a plurality of air vents oriented between the top member and the bottom member;

the top member having a plurality of top member air openings and a plurality of slots configured to receive transparent panels;

a plurality of transparent panels positioned in the slots, the transparent panels oriented such that adjacent transparent panels define elongated gaps between edges of the adjacent transparent panels, the transparent panels oriented in a spaced relationship with respect to the bottom member, the device further comprising a wick cup positioned at least in part in the base and above an oil reservoir.

* * * * *